United States Patent [19]

Chun

[11] Patent Number: 4,487,226

[45] Date of Patent: * Dec. 11, 1984

[54] FAILURE SENSING HYDRAULIC ACCUMULATOR AND SYSTEM

[75] Inventor: Hugh H. Chun, Hacienda Heights, Calif.

[73] Assignee: VSI Corporation, Pasadena, Calif.

[ * ] Notice: The portion of the term of this patent subsequent to Jan. 31, 2001 has been disclaimed.

[21] Appl. No.: 534,321

[22] Filed: Sep. 21, 1983

Related U.S. Application Data

[63] Continuation-in-part of Ser. No. 407,564, Aug. 12, 1982, Pat. No. 4,428,401.

[51] Int. Cl.³ .............................................. F16L 55/02

[52] U.S. Cl. .......................................... 138/30; 73/40; 73/304 C

[58] Field of Search ............................ 138/26, 30, 31; 220/85 B; 73/40.33, 40.5 R, 715, 718, 304 C; 116/70, 208; 340/623

[56] References Cited

U.S. PATENT DOCUMENTS

| | | | |
|---|---|---|---|
| 3,722,578 | 3/1973 | Frei et al. | 138/30 X |
| 3,929,163 | 12/1975 | Schon | 138/30 |
| 4,014,213 | 3/1977 | Parquet | 138/30 X |
| 4,088,154 | 5/1978 | Patton et al. | 138/30 |
| 4,167,201 | 9/1979 | Zahid | 138/30 |
| 4,207,563 | 6/1980 | Soupal | 138/31 X |
| 4,428,401 | 1/1984 | Chun | 138/30 |

*Primary Examiner*—James E. Bryant, III
*Attorney, Agent, or Firm*—Arthur B. Colvin

[57] ABSTRACT

A failure sensing accumulator device and to a system embodying the same. The accumulator and system are characterized in that various failure situations are sensed by a capacitive sensor apparatus which is capable of detecting failures at an early stage and localizing the damage to the system resulting from such failed accumulator.

2 Claims, 2 Drawing Figures

FAILURE SENSING HYDRAULIC ACCUMULATOR AND SYSTEM

Figure 1:
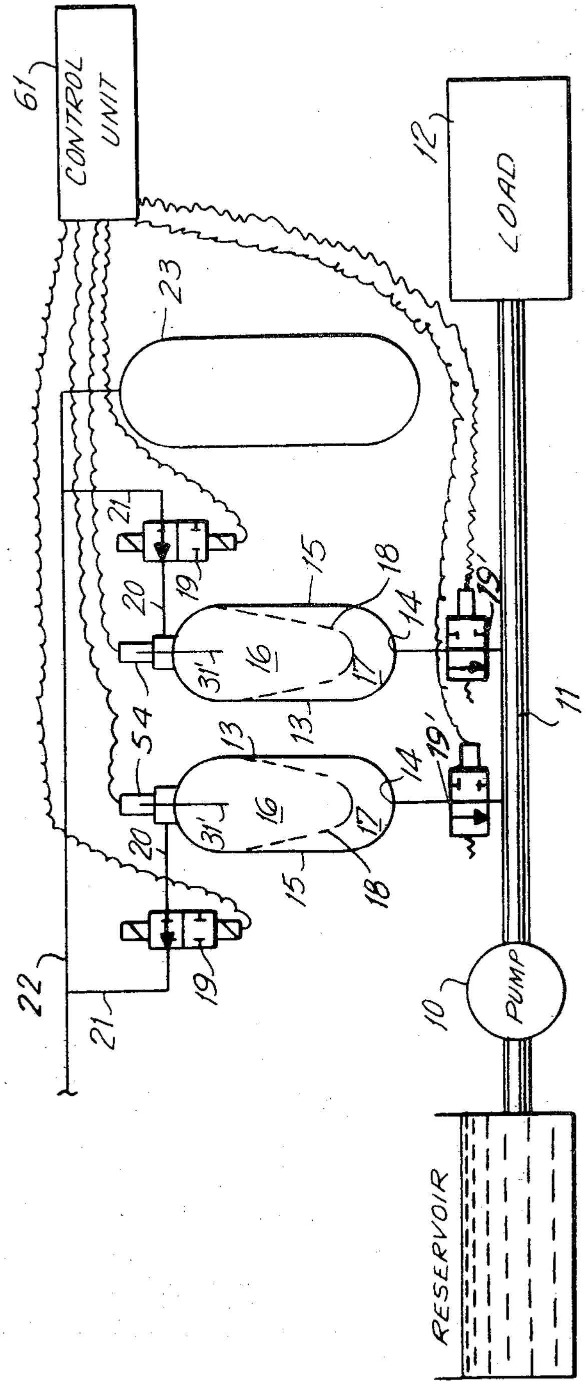

This application is a continuation-in-part of co-pending application Ser. No. 407,564 filed Aug. 12, 1982 now U.S. Pat. No. 4,428,401.

BACKGROUND OF THE INVENTION

1. Field of the Invention

The present invention is in the field of hydraulic accumulator devices and is directed, more particularly, to a failure sensing hydraulic accumulator device and system embodying the same.

2. The Prior Art

Hydraulic accumulators are conventionally employed in numerous pumping applications wherein it is desired to store energy and to release the energy when pressure in the hydraulic system falls below a selected level. It is also known to incorporate a multiplicity or bank of such accumulators to multiply the energy storing capacity of the system.

It is further known to incorporate in a hydraulic accumulator a pressure sensing apparatus which will detect failure of the bladder dividing the gas and oil chambers of the accumulator. In the past, devices of the type described have included an external pressure sensing mechanism which is responsive to reduction of gas pressure and which, upon detection of such reduction in gas pressure, functions to sound an alarm signifying failure. Examples of accumulators or like devices which utilize conventional pressure sensors are found in U.S. Pat. Nos. 4,167,201; 4,207,563; 4,014,213 and 4,221,124.

The problems inherent in sensor apparatus heretofore known reside principally in that the same are pressure responsive and are thus triggered only when material pressure changes are sensed.

SUMMARY OF THE INVENTION

The present invention is directed to improvements in accumulator devices and more particularly to a failure sensing accumulator device characterized in its ability to detect incipient failures, either by way of bladder rupture or by way of loss of gas pressure at an early stage to provide timely warning of such failure and/or operate associated fail safe mechanisms. In accordance with the invention an essentially conventional accumulator device includes a capacitance sensing probe member introduced into the gas chamber of the accumulator device. Such probe member is able to sense the approach of the bladder member and/or the approach of oil or other hydraulic fluids entering the gas chamber as would be the case in the event of bladder failure. Such sensor device has been found to give more reliable and earlier indications of failure than the pressure sensing apparatus heretofore used. The invention is further directed to a hydraulic system which includes a plurality of accumulators of the type described, a common gas supply and valving means responsive to the sensing of a failure, which function automatically to interrupt the circuit between the gas supply and the gas chamber and between the fluid or oil supply and the oil chamber of the defective accumulator immediately upon sensing failure in the specific accumulator.

It is accordingly an object of the invention to provide a hydraulic accumulator having improved failure sensing capabilities. It is a further object of the invention to provide an accumulator of the type described wherein failure sensing is effected by a mmeans capable of detecting changes in capacitance. Still a further object of the invention is the provision of a hydraulic system, which includes a plurality of accumulators of the type described, together with an actuating mechanism which disassociates a defective accumulator or accumulators from a master gas reservoir and from the fluid or oil supply and the hydraulic load, responsive to the sensing by capacitance of a failure condition.

In order to attain these objects and such further objects, which may appear hereinafter or be hereinafter pointed out, reference is made to the accompanying drawings wherein, FIG. 1 is a schematic diagram of a hydraulic system employing the novel accumulator in accordance with the invention.

Figure 2:
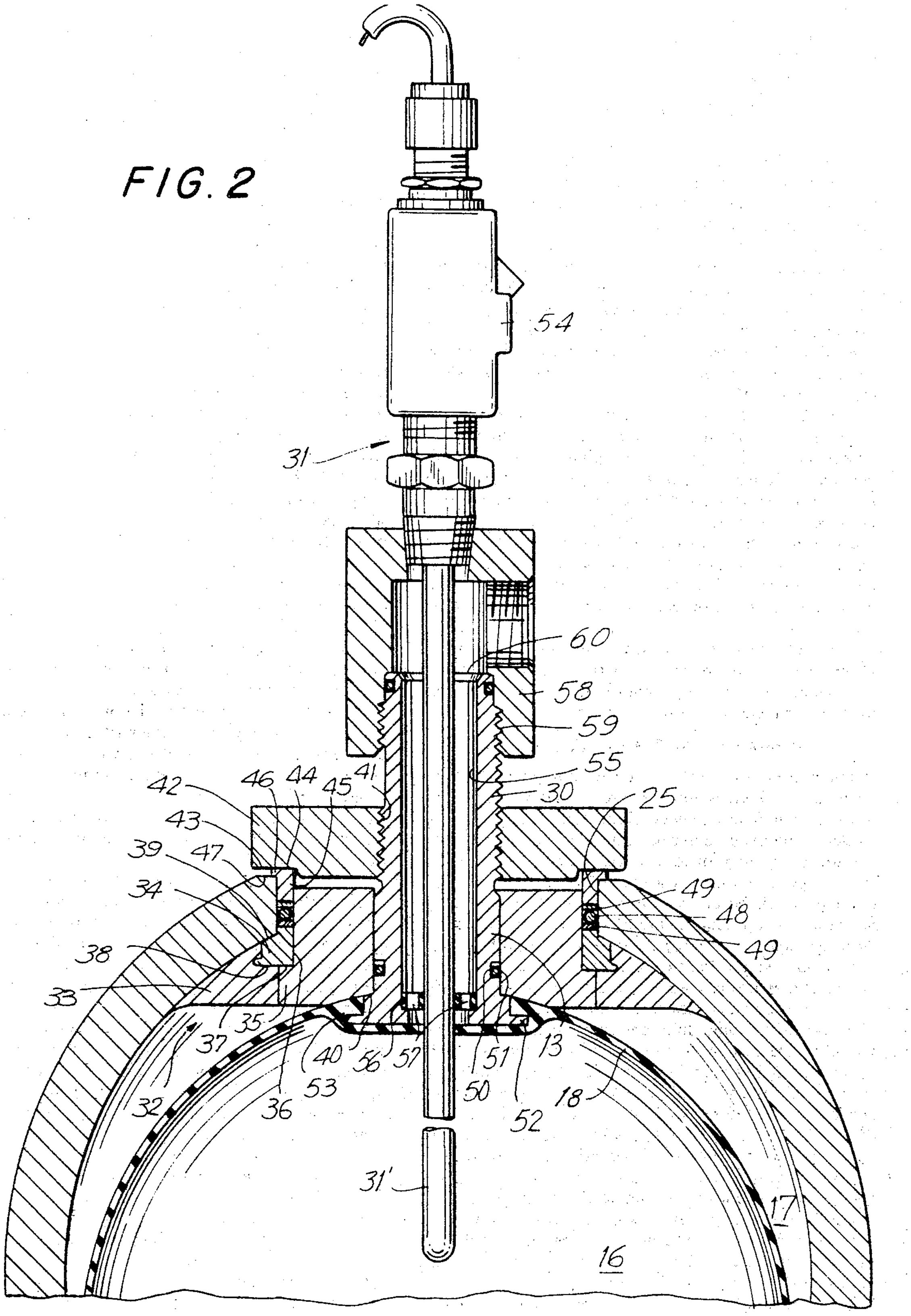

FIG. 2 is a magnified fragmentary sectional view through the gas charging end of a device in accordance with the invention.

Referring now to FIG. 1, there is disclosed a hydraulic circuit which includes a pump 10, a hydraulic conduit 11 and a load 12. A pair of accumulators 13 have their oil ports 14 operatively connected to the hydraulic line 11 via normally open solenoid valves 19'. As is conventional, the accumulators 13 include pressure vessels 15 which are divided into two chambers, namely the gas chamber 16 and an oil chamber 17, by an expansible bladder member 18, the oil ports 14 being in communication with oil chambers 17.

The gas chambers 16 are connected via normally open solenoid valves 19 through conduits 20 and 21 to a pressure line 22 emenating from a gas reservoir bottle 23.

The hydraulic system is shown in its normal operating condition in FIG. 1, from which figure it will be evident that when the pressure in the hydraulic line 11 exceeds the pressure in gas chambers 16, fluid will be forced through the open valves 19' and through the oil ports 14 into the interior of the pressure vessel into oil chamber 17 compressing the gas in the gas chambers 16 resulting in a storage of energy within the compressed gas. When the pressure drops in the line 11, the gas in the chambers 16 will expand releasing energy to the hydraulic load.

As will be apparent from the preceeding description, if either of the bladder members 18 should fail, not only would the energy storing capacity of the accumulator in question be lost the the system, but in addition hydraulic fluid may be forced outwardly through the gas port contaminating the gas lines and introducing liquids into the gas system of the apparatus, and also gas may be forced outwardly through the oil port 14 into the line 11 and the load which may include a hydraulic actuator rendering the latter inoperative due to the compressibility of the gas forced thereinto. The magnitude of the difficulties which may inhere in such situation will be readily appreciated when it is considered that while the illustrated embodiment shows only two accumulators, large systems may incorporate a multiplicity of such devices. It is a function of the accumulator device of the present invention to sense the possibility of bladder failure or pressure drop at the earliest possible time and to provide effective means for preventing oil from entering into the gas supply of the system and gas from entering into the hydraulic load, by isolating each defective accumulator from the system. With the foregoing general description in mind, reference will now be made to a detailed description of the accumulator and more particularly to the sensing components thereof forming the principal advance of the present invention.

With reference to FIG. 2, the gas charging port 25 includes a tubular fitting 30 which houses the sensing assembly 31. The fitting 30 is preferably mounted against a segmented assembly 32 in accordance with U.S. Pat. Nos. 3,439,712 or 3,782,418, the segmented assembly including an annular support gasket 33 to which is bonded the two separated halves of an annular metallic washer member 34. As set forth in the noted patents, the assembly 32 is inserted through the port 25 by folding the gasket 33 at the dividing line between the segments 34 and permmitting the same to spring outwardly after reaching a position within the pressure vessel.

A compression washer 35 is disposed within the interior diameter 36 of the assembly 32, an outwardly facing shoulder 37 of the washer 35 bearing against the underface 38 of the segments 34 of the assembly 32. As will be apparent from the drawings, the segment portions 34 include upwardly directed stop portions 39 which bear against the interior walls of the pressure vessel adjacent the port 25.

The tubular fixture 30 includes an upwardly directed shoulder 40 which bears against the undersurface of the compression washer 35. The outer surface of the fixture 30 is threaded, as at 41, to define a receiver means for jam nut 42. The undersurface 43 of the jam nut 42 bears against the uppersurface 44 of insert washer 45, the extending ledge portion 46 of the washer 45 bearing against upwardly facing portion 47 of the pressure vessel surrounding the gas port. Preferably, a seal assembly comprising an O-ring 48 sandwiched between a pair of thin washer members 49 is interposed between segments 34 and washer 45 to assure a tight seal at the gas port.

The tubular member 30 is recessed as at 50, which recess carries an O-ring 51 defining a seal between washer 35 and the fixture 30.

The lower end of fixture 30 includes an annular flange member 52 to which a thickened rim portion 53 of the bladder 18 is bonded to provide mounting for the bladder.

The sensing assembly 31 includes a sensing head 54 and a sensing probe 31'. The sensing probe 31' is supported centrally in an axial bore 55 within fixture 30 by a spacer washer 56. The washer 56 includes a plurality of throughgoing apertures 57, which provide passage for gas to the interior of the bladder member, i.e. to the gas chamber 16.

The fixture member 30 includes a fitting 58 threadedly mounted over the portion 59 of the fitting. The fitting 58 includes a mounting aperture 60 for connection thereto of solenoid valve 19 by conduit 20.

The sensing probe 31' and the sensing assembly comprises a capacitance responsive unit. Suitable capacitance responsive units are know per se. Without limitation and for purposes of compliance with the patent laws, a suitable capacitance type sensor is manufactured by Princo Instruments, Inc. of South Hampton, Pa. and is identified as their model 1510.

Basically, the unit described comprises a probe member 31', which is sensitive to changes in capacitance and is supplied with a control unit, e.g. the control unit 61 which is electrically connected to the probe and which may be set to trigger an alarm or to pass a current to an associated apparatus responsive to a predetermined and preferably a variably selectable change in capacitance.

In the illustrated embodiment, the solenoid valves 19 and 19' are interposed in the circuit such as to isolate conduit 20 from conduit 21 and hence from conduit 22 and gas bottle 23 in the case of valve 19, and to isolate port 14 from line 11 and hence from the load 12, responsive to a sensed abnormal condition derived from the probe 31'.

The operation of the device will next be described from which operation the advantages inherent in the instant invention as compared to accumulators embodying sensors heretofore known will become immediately apparent.

Under normal operating conditions the bladder members 18 will be spaced from the probe 31' by a range of distances. The capacitance sensing sensitivity of a unit may be set in such manner that when the bladder approaches the probe 31' within a certain degree of proximity, the presence of the bladder induces a capacitive change of a magnitude to trigger the control unit 61 to shift the position of the valves 19,19' such as to isolate the gas chamber 16 of the failure sensed accumulator from the line 21 to the gas bottle 23, and to isolate the oil chamber 17 from the line 11 to the load 12. It will be appreciated that the capacitance change may result either from an approach of the bladder toward the probe as might occur in the event of a rupture or as a result of a reduction in gas pressure within the particular accumulator. Similarly, a capacitance change would be sensed responsive to the flow of hydraulic fluids into the gas chamber as from a rupture of the bladder, even if the bladder were to be distended outwardly and therefore not approach the probe.

From the foregoing it will be apparent that by virtue of the use of a capacitive probe a failure condition is detected at an early stage, i.e. before the outflow of hydraulic fluid through the gas port or the flow of gas through the oil port 14. It is thus possible to isolate a given accumulator from an installation and positively prevent contamination of the gas system of the installation or the inoperativeness of the hydraulic load due to the presence of gas therein, by isolating the defective accumulator from the system.

As will be evident from the preceeding description numerous variations in details of construction may be made without departing from the spirit of the invention.

Accordingly, the same is to be broadly construed within the scope of the appended claims.

Having thus described the invention and illustrated its use, what is claimed as new and is desired to be secured by Letters Patent in the United States is:

1. A hydraulic accumulator system for operating a hydraulic load, comprising a plurality of pressure vessels each having an oil port, a gas charging port, a bladder assembly disposed in said vessel and dividing the same into gas and oil chambers in communication with said gas and oil ports respectively, a capacitive probe member extending through said gas port into said gas chamber, said probe member being responsive to the presence of liquids and to proximity of said bladder, a gas charging fixture extending from said gas port, a filling orifice leading into said fixture, a first solenoid valve associated with each said filling orifice, a second solenoid valve associated with each said oil port, each said second solenoid valves being adapted to be connected to such hydraulic load, a gas reservoir, conduit means leading from said reservoir to said first solenoid valves, normally to couple said filling orifices and hence said gas chambers to said reservoir, said second solenoid valves being adapted to be interposed between said oil ports and said hydraulic load, and control means operatively connected to said valves and said probe for shifting said valves to decouple said gas ports from said reservoir, and said oil ports from such hydraulic load, responsive to a predetermined capacitive change sensed by said probe.

2. A hydraulic accumulator system for operating a hydraulic load comprising a plurality of pressure vessels each having an oil port at one end and a gas charging port at the other end, fitting means at said oil port for coupling said oil port to such hydraulic load, a bladder member disposed within each said vessel and dividing the same into a gas chamber and an oil chamber in communication respectively with said gas and oil ports, a capacitive probe sensor member extending through said gas port into said gas chamber, said sensing member being responsive to the presence of liquids and to proximity of said bladder member, a tubular gas charging fixture mounted in said gas port and extending generally axially of said vessel, said probe being mounted coaxially within said fixture and defining with said fixture an annular passage, a gas filling orifice formed in said charging fixture and in communication with said annular passage, a first solenoid valve member connected to said gas filling orifice, a second solenoid valve member connected to said oil port fitting, and circuit means operatively associated with said valve members and said probe member for opening or closing said valves selectively in accordance with variations in capacitance sensed by said probe member.

* * * * *